(12) United States Patent
Ozeki

(10) Patent No.: US 6,289,710 B1
(45) Date of Patent: Sep. 18, 2001

(54) METHOD OF MANUFACTURING A HOLLOW RACK BAR

(75) Inventor: Keita Ozeki, Kasugai (JP)

(73) Assignee: TRW Automotive Japan Co., Ltd., Aichi-Ken (JP)

( * ) Notice: Subject to any disclaimer, the term of this patent is extended or adjusted under 35 U.S.C. 154(b) by 0 days.

(21) Appl. No.: 09/479,969

(22) Filed: Jan. 10, 2000

(30) Foreign Application Priority Data

Jan. 11, 1999 (JP) .................................................. 11-004378

(51) Int. Cl.$^7$ ....................................................... B21K 1/12
(52) U.S. Cl. ........................................... 72/370.04; 72/356
(58) Field of Search ..................................... 72/355.4, 356,
72/370.04, 370.21, 370.23, 398, 471, FOR 101;
29/893.34

(56) References Cited

U.S. PATENT DOCUMENTS 1,983,584 * 12/1934 Urschel .............................. 72/370.04
3,670,555 * 6/1972 Fredericks ......................... 72/370.05
4,598,451   7/1986 Ohki .

FOREIGN PATENT DOCUMENTS 137335   11/1989 (JP) .
35892     2/1991 (JP) .

* cited by examiner

Primary Examiner—Lowell A. Larson
(74) Attorney, Agent, or Firm—Tarolli, Sundheim, Covell, Tummino & Szabo L.L.P.

(57) ABSTRACT

A method for manufacturing a hollow rack bar having a flat portion thick enough, which prevents difficulty in pulling out a core after press working. The flat portion is formed by inserting the core having an approximately central depression in the longitudinal direction into a steel pipe and pressing the steel pipe from the outside by an upper and a lower dies. Subsequent to the formation of the flat portion, rack teeth are formed by placing the steel pipe in a tooth profile forming die and forcibly inserting a mandrel into the steel pipe.

3 Claims, 6 Drawing Sheets

METHOD OF MANUFACTURING A HOLLOW RACK BAR

FIELD OF THE INVENTION

The present invention relates to a method of manufacturing a hollow rack bar, wherein a flat portion is formed in a steel pipe and rack teeth are formed in the flat portion.

BACKGROUND OF THE INVENTION

In a conventional rack-and-pinion steering system for motor vehicles and the like, a rack bar has been employed. Recently, it has been tried to hollow the rack bar so as to make it more lightweight. In a method of manufacturing such a hollow rack bar, as disclosed in Publication of Examined Japanese Utility Model Application No. Hei 1-87335, an electric resistance welded tube or an extrusion molded steel pipe is employed and rack teeth are formed in the periphery of the tube or the steel pipe by press working. In the press working, as shown in FIG. 7, a steel pipe 50 into which a core 52 is inserted is placed between an upper and a lower metal dies and another upper metal die 58 having a rack teeth configuration is pressed on the periphery of the steel pipe 50, and thereby the rack teeth are formed.

However, such a conventional method has a problem that since the core has a central flat portion and downward slopes on both sides thereof, the diameter of a corner 60 becomes large, so that an enough thickness of a flat portion 62 cannot be obtained. Furthermore, deformation of the inner periphery of the steel pipe 50 during the press working results in close contact of the core 52 with the inner periphery of the steel pipe 50 and prevents the core 52 from being removed from the steel pipe 50.

SUMMARY OF THE INVENTION

Wherefore, an object of the present invention is to provide a manufacturing method of a hollow rack bar provided with a flat portion having an enough thickness, which prevents difficulty in removing a core inserted during press working.

This and other objects of the invention are achieved in a manufacturing method of a hollow rack bar by flattening a steel pipe to form a flat portion and forming rack teeth in the flat portion, wherein the flat portion is formed by inserting a core having an approximately central depression in the longitudinal direction into the steel pipe and pressing the steel pipe from the outside using metal dies.

Preferably, after forming the flat portion, the rack teeth are formed by placing the steel pipe in a tooth profile forming die and forcibly inserting a mandrel into the steel pipe. Furthermore, the flat portion is preferably made thick.

Advantages of this manufacturing method are that an enough thickness of the flat portion can be obtained, that the core can easily be pulled out after the formation of the flat portion, and that the endurance of the core is improved.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 3:
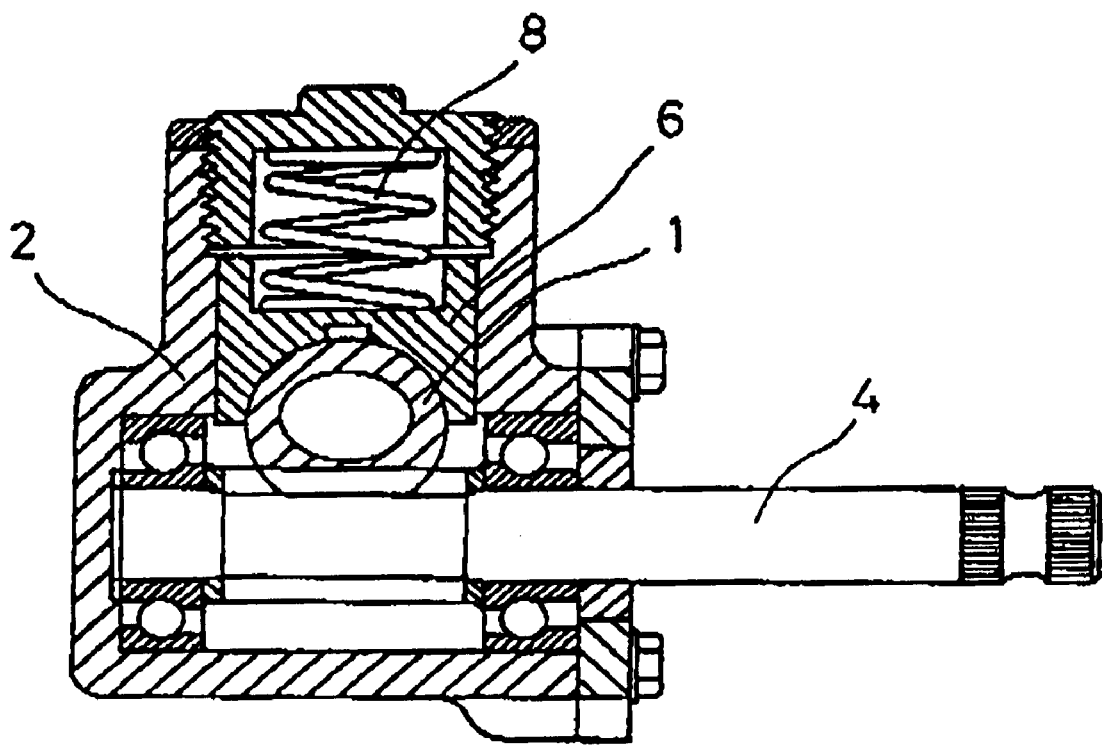
FIG. 3 is a cross sectional view of the main part of a steering mechanism using a hollow rack bar.
Figure 4:
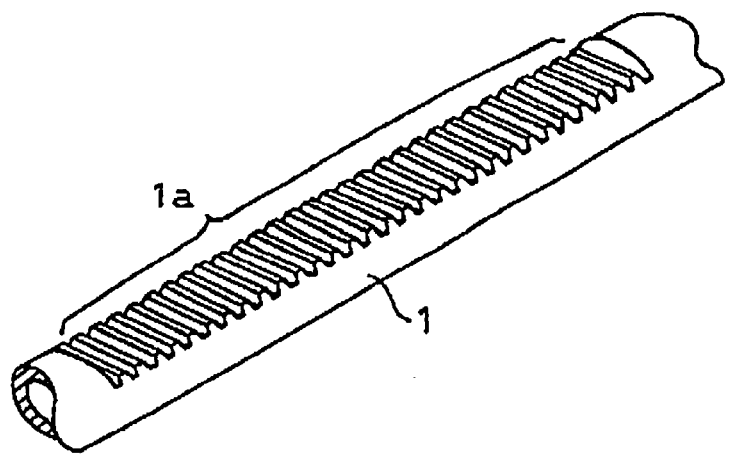
FIG. 4 is a perspective view of rack teeth of a hollow rack bar.

As shown in FIG. 3, a hollow rack bar 1 is engaged with a pinion 4 rotatably held in a gear housing 2. The rack bar 1, as shown in FIG. 4, is provided with rack teeth 1a formed in the periphery thereof. The rack teeth 1a are engaged with the pinion 4. On the opposite side of the rack bar 1 to the pinion 4 is pressed a rack guide 6 by means of the biasing force of a spring 8, which adjusts the engagement of the rack bar 1 with the pinion 4 by pressing the rack bar 1 toward the pinion 4.

Figure 1:
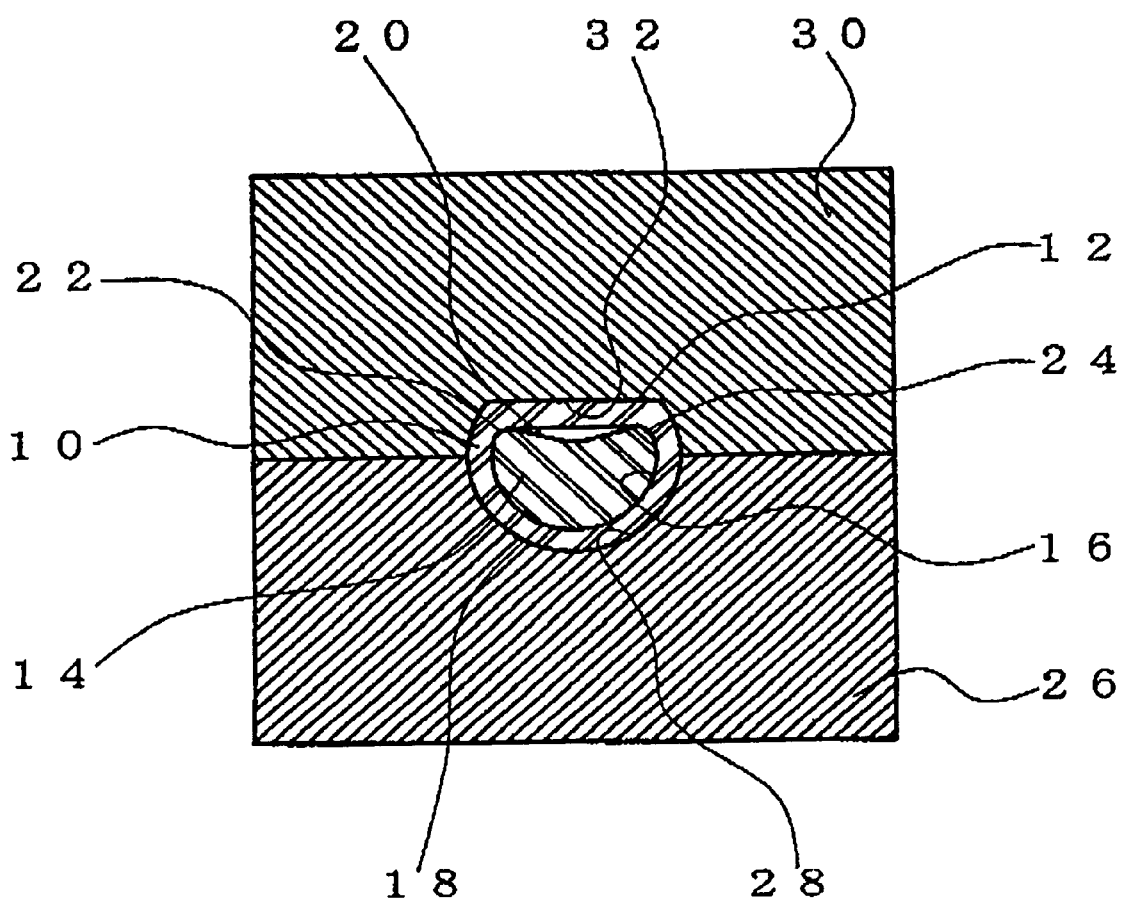
FIG. 1 is a cross sectional view showing the state that a steel pipe into which a core is inserted is placed between an upper die and a lower die in a manufacturing method of a hollow rack bar according to a preferred embodiment of the present invention.
Figure 5:
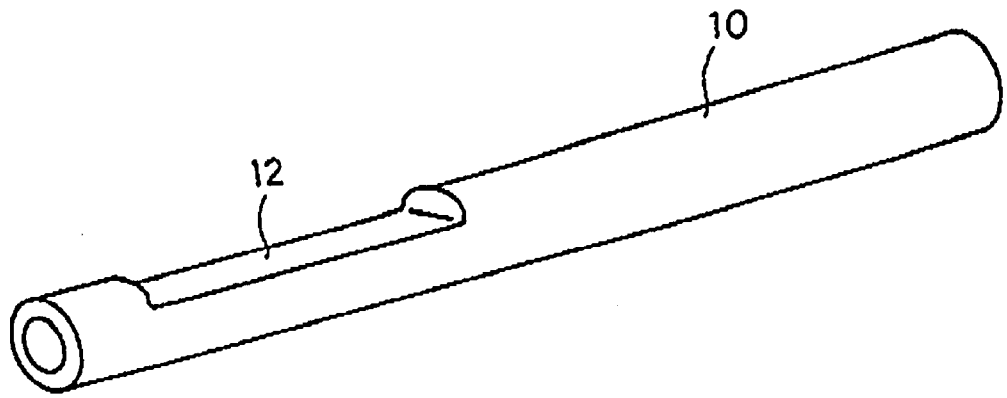
FIG. 5 is a perspective view of a steel pipe with a flat portion formed therein.

For manufacturing the hollow rack bar 1, an electric resistance welded tube or an extrusion molded steel pipe is employed as a blank, and firstly a flat portion 12 is formed in the steel pipe 10 as shown in FIG.5. Specifically, as shown in FIG.1, a core 14 is inserted into the steel pipe 10. The core 14 has an arcuate portion 18 corresponding to the shape of the inner surface 16 of the steel pipe 10 and an upper portion 20 corresponding to the shape of the inner surface of the flat portion 12. The upper portion 20 is formed to have an approximately central depression in the longitudinal direction, that is its cross section has an obtuse V-shape. The corners 22, 24 are formed to have a radius r smaller than a radius R of the arcuate portion 18.

The lower metal die 26 has a semicylindrical channel 28, and the arcuate portion 18 of the core 14 is formed to contact the inner surface 16 of the steel pipe 10 such that when the steel pipe 10 with the core 14 inserted therein is placed in the channel 28, a thickness t of the steel pipe 10 between the core 14 and the channel 28 is approximately the same as that of the steel pipe 10 in the original state.

The upper metal die is provided with a channel 32 formed in accordance with the flat portion 12 such that when the upper metal die 30 is pressed on the lower metal die 26, a thickness T between the upper portion 20 of the core 14 in the channels 28, 32 and the channel 32 is bigger than the thickness t. The radius r of the corners 22, 24 is desirably selected such that the thickness t is gradually increasing up to the thickness T.

Figure 2:
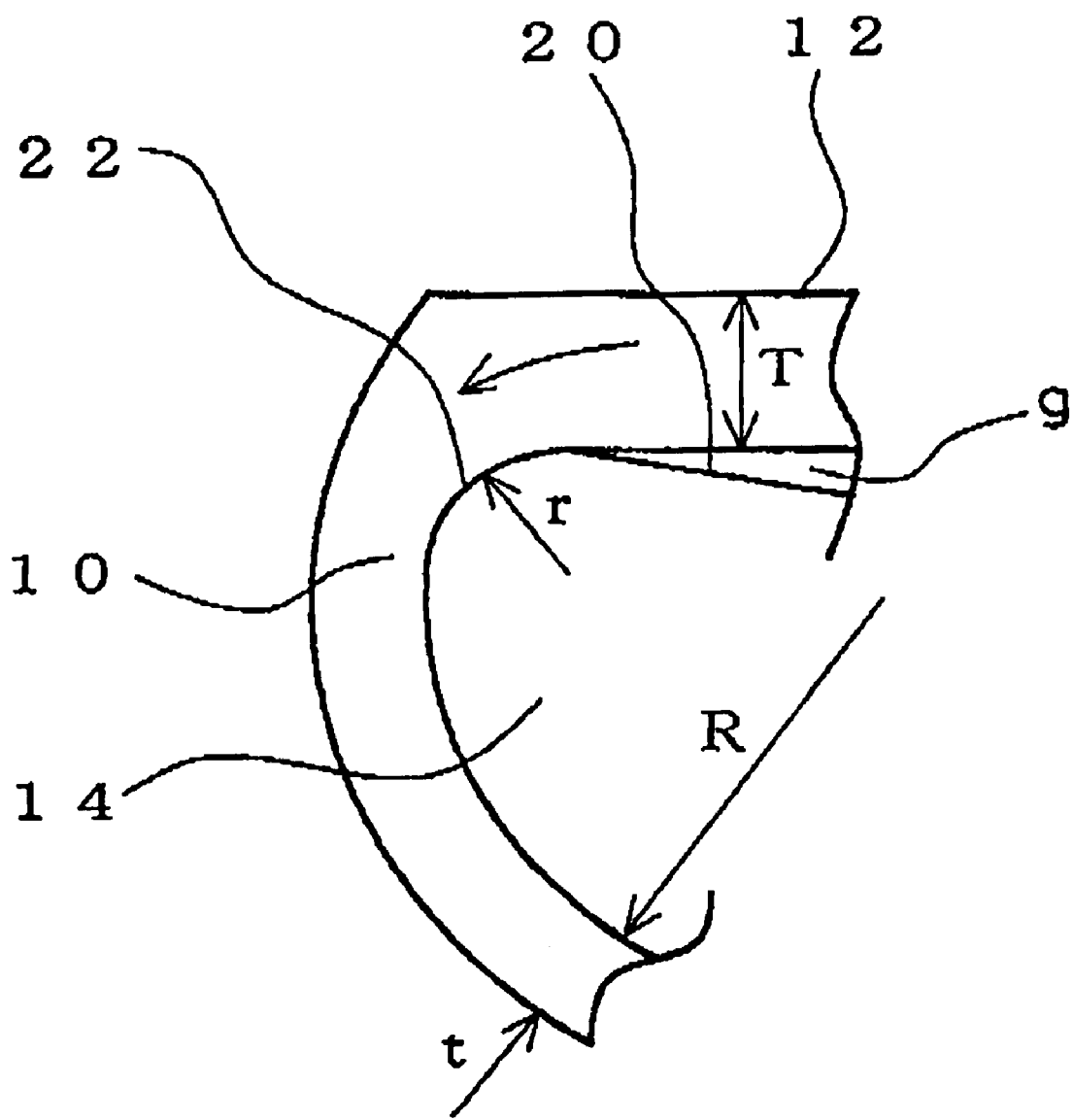
FIG. 2 is a partially enlarged cross sectional view showing the state that the core is inserted into the steel pipe according to the preferred embodiment.

In the pressing process, the core 14 is inserted into the steel pipe 10, and the steel pipe 10 is placed in the channel 28 of the lower metal die 26. Then, cold flattening is performed by pressing the upper metal die 30 on the lower metal die 26, and thereby the flat portion 12 is formed. In this case, as shown in FIG.2, the flat portion is formed to have the thickness T, which is larger than the thickness t. The inner surface of the flat portion 12 and the upper portion 20 of the core 14 do not closely contact with each other, that is a gap g occurs therebetween.

Specifically, when the flat portion 12 is formed by flattening the steel pipe 10, outward material flow from the side of the flat portion 12 is caused as indicated by an arrow in FIG.2. Since the steel pipe 10 is pressed against the corners 22, 24, the inner surface of the steel pipe is formed into a shape in accordance with the radius r of the corners 22, 24. The flat portion 12 is formed to have the thickness T by the upper metal die 30 and the corners 22, 24.

In this case, although the flat portion 12 is flattened by and put into close contact with the upper metal die 30, the gap g occurs between the depressed upper portion 20 and the inner surface of the steel pipe 10. Therefore, after the flattening is performed, the core 14 is not caught in the steel pipe 10.

Subsequent to the formation of the flat portion 12, the upper metal die 30 is lifted off and the steel pipe 10 is taken out of the lower metal die 26, then the core is pulled out of the steel pipe 10. Since there is a gap g between the inner surface of the flat portion 12 and the upper portion 20 of the core 14, the core 14 can be easily pulled out of the steel pipe 10.

Figure 6:
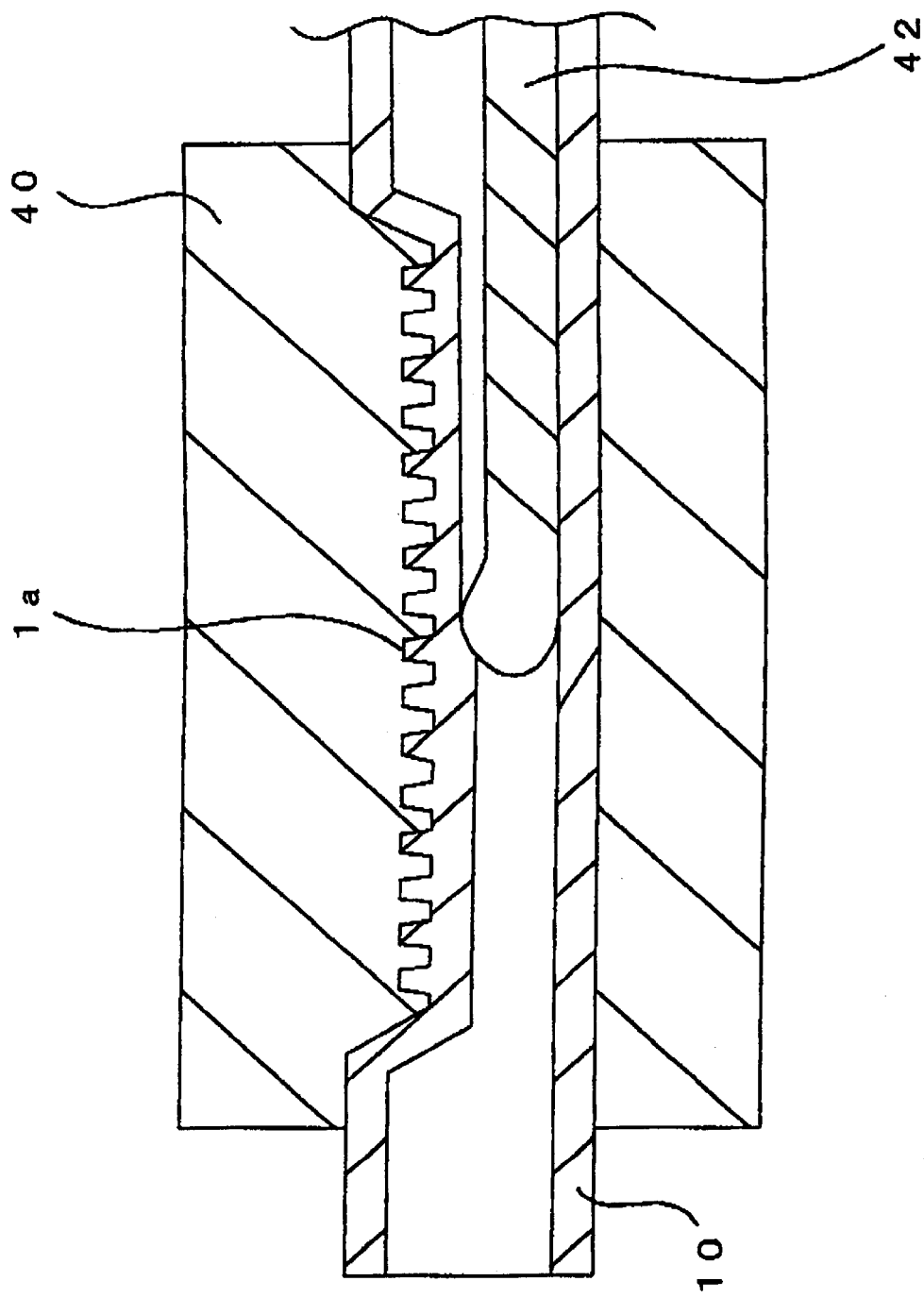
FIG. 6 is a longitudinal sectional view showing how the rack teeth are formed according to the manufacturing method of a hollow rack bar in the embodiment.
Figure 7:
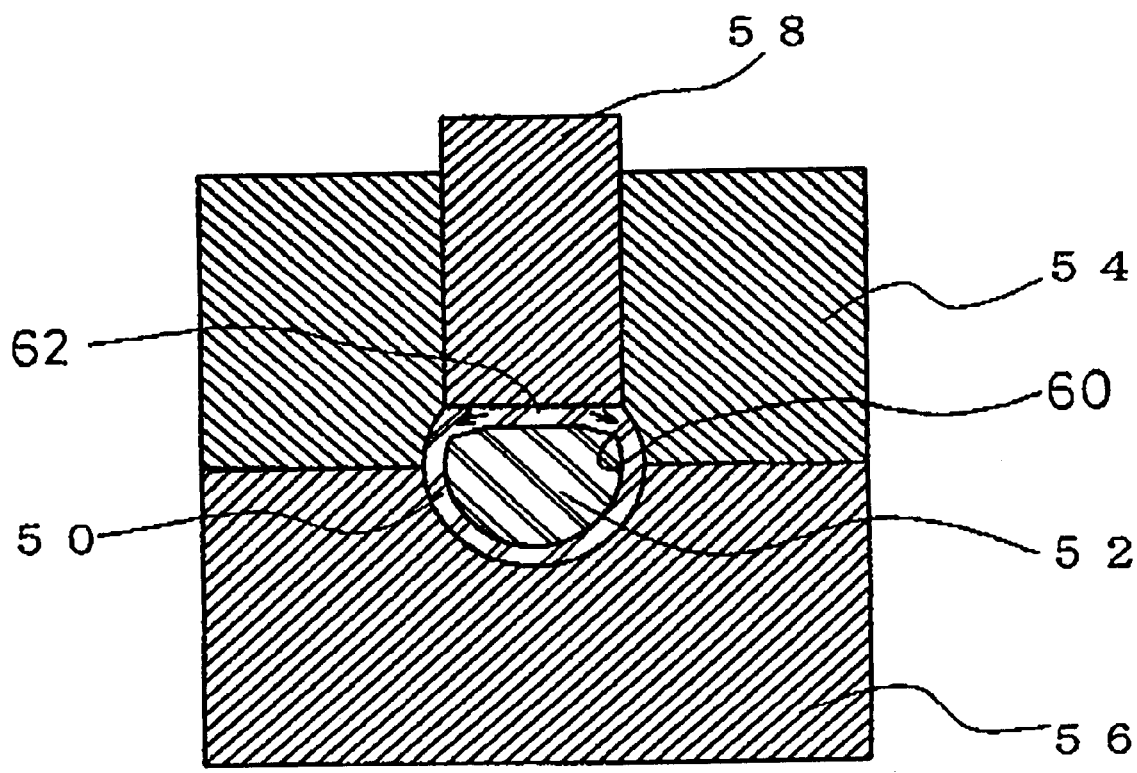
FIG. 7 is a cross sectional view showing the state that a steel pipe, into which a core is inserted, is placed between upper dies and a lower die according to a conventional manufacturing method of a hollow rack bar.

Next, as shown in FIG.6, the steel pipe is placed in a tooth profile forming die 40, a mandrel 42 is forcibly inserted into the steel pipe, and thereby a material flow from inside the steel pipe 10 in the radial direction is caused, with the result that rack teeth 1a are formed. Thus, a rack bar 1 is formed. Although the flat portion 12 is flattened by the upper metal die 30 according to the present embodiment, it may be flattened by an upper metal die 58, as shown in FIG. 7.

The invention is not limited to the above described embodiment and may be embodied in various forms without departing from the spirit and the scope of the invention.

What is claimed is:

1. A method of manufacturing a hollow rack bar comprising the steps of:

providing a hollow steel pipe;

inserting a core having a surface defining a central depression in the longitudinal direction into said steel pipe;

pressing said steel pipe from the outside using metal dies to form a flat portion on said steel pipe and a gap between said surface defining a central depression and said flat portion;

removing said core from said steel pipe; and forming rack teeth on said flat portion.

2. The method of manufacturing according to claim 1, wherein said rack teeth are formed by placing said steel pipe in a tooth profile forming die and forcibly inserting a mandrel into said steel pipe.

3. The method of manufacturing according to claim 1 wherein said hollow steel pipe has a wall thickness, and said pressing step includes forming said flat portion with a thickness greater than the wall thickness of said hollow steel pipe.

* * * * *